Nov. 8, 1932.  L. W. HASSENSALL  1,887,020
WATER COOLER
Filed Sept. 17, 1931   5 Sheets-Sheet 1

Nov. 8, 1932.    L. W. HASSENSALL    1,887,020
WATER COOLER
Filed Sept. 17, 1931    5 Sheets-Sheet 2

Nov. 8, 1932.  L. W. HASSENSALL  1,887,020
WATER COOLER
Filed Sept. 17, 1931  5 Sheets-Sheet 3

Inventor
L. W. Hassensall.
By Lacey & Lacey,
Attorneys

Nov. 8, 1932.   L. W. HASSENSALL   1,887,020
WATER COOLER
Filed Sept. 17, 1931     5 Sheets-Sheet 4

Inventor
L. W. Hassensall.
By Lacey & Lacey, Attorneys

Nov. 8, 1932.    L. W. HASSENSALL    1,887,020
WATER COOLER
Filed Sept. 17, 1931    5 Sheets-Sheet 5

Inventor
L. W. Hassensall.
By Lacey & Lacey,
Attorneys

Patented Nov. 8, 1932

1,887,020

UNITED STATES PATENT OFFICE

LOUIS W. HASSENSALL, OF TOLEDO, OHIO

WATER COOLER

Application filed September 17, 1931. Serial No. 563,400.

This invention relates to a water cooler and more particularly to a water cooler wherein solid carbon dioxide may be used as a cooling medium.

One object of the invention is to provide the water cooler with an improved container for a block of solid carbon dioxide and have this container so mounted in the cooler that access may be had to the container exteriorly of the cooler, thereby permitting a new block of solid carbon dioxide to be inserted into the container without opening the cooler.

Another object of the invention is to provide a water cooler in which gases formed by the evaporating solid carbon dioxide may be led through selected tubes leading from the container and this gas discharged either internally or externally of the cooler.

Another object of the invention is to provide a cooler of this character wherein one of the tubes is formed into a coil about the container for the solid carbon dioxide and provide the container with means for controlling flow of gas through the tubes adapted to be adjusted by actuating means carried by a removable cover for the outer end of the container, thereby permitting flow of gas through the container and tubes to be very easily controlled and the temperature of the water in the cooler regulated.

Another object of the invention is to not only permit flow of gas through the container to be regulated, but also permit the block of solid carbon dioxide to be disposed either in spaced relation to the inner end of the container or pressed firmly into engagement with the inner end of the container when very cold water is desired.

Another object of the invention is to permit the gas which escapes from the tubes within the cooler to be directed downwardly towards the bottom of the water container and bubble up through the water therein in order to carbonize the water or allow the gas to pass off into the container without passing through the water and also pass downwardly into a compartment below the water compartment in which bottles of beverages or food are to be placed and cool this second compartment.

Another object of the invention is to permit gas to be delivered externally of the cooler from the tubes through a pipe which may be placed in a glass filled with water, thereby causing the water in the glass to be carbonized without all of the water in the cooler becoming carbonized.

Another object of the invention is to so form the upper portion of the cooler that a bottle of large capacity may be set in place in an inverted position in order to replenish water in the water compartment of the cooler as it is drawn off, and prevent warm air from entering the water compartment of the cooler.

The invention is illustrated in the accompanying drawings wherein:

Figure 17 is a fragmentary view of the inner end portion of the outer shell of the container for the cooling medium.

Figure 1:
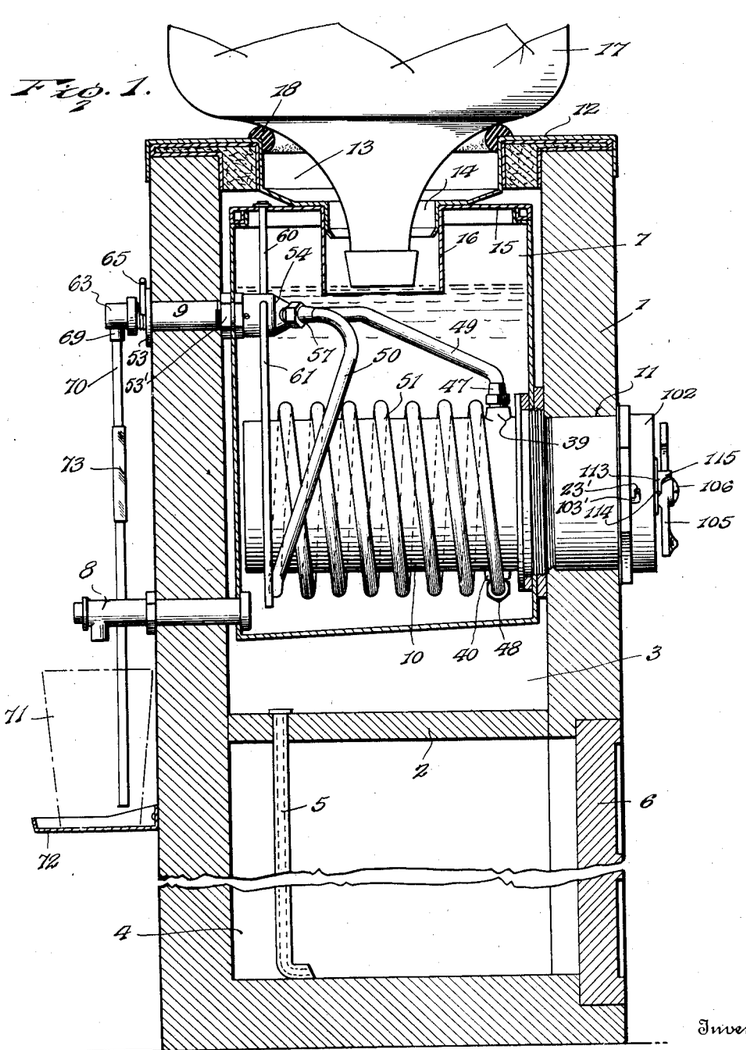
Figure 1 is a vertical sectional view through the improved cooler showing the container for the solid carbon dioxide and the tubes leading therefrom in elevation.

The improved water cooler indicated in general by the numeral 1 is divided by a partition 2 into an upper chamber 3 and a lower chamber 4 which has communication with the upper chamber through a pipe 5 and has a door 6. This door may be hingedly mounted in any desired manner so that access may be had to the lower compartment in order that bottles of beverages or food may be placed in or removed from the lower compartment.

Within the upper chamber, which may be referred to as a water compartment, is disposed a crock or water container 7 which may be formed of any suitable material and preferably has a capacity of about three-fourths of a gallon although it may have any capacity desired. A faucet 8 leads from near the bottom of the crock 7 through a wall of the cooler and near the top of the crock is provided a distributer 9 which also extends outwardly through the wall of the cooler above the faucet 8.

A container 10 for a cooling medium, which is preferably solid carbon dioxide, is disposed transversely in the lower portion of the crock and extends from the same through an opening 11 formed in a wall of the cooler. This container for the cooling medium may project through either a rear wall or side wall of the cooler, but will preferably project through a side wall so that access may be had to the outer end of the container without moving the cooler in case it is placed in a room against a wall. It should also be noted that the container for the cooling medium may project outwardly through a wall of the cooler either at a side opposite the faucet 8 and distributer 9, as shown in Figure 1, or at right angles thereto.

The open upper end of the cooler is provided with a head 12 which fits firmly into place and has its central portion formed with a depending well 13 from the bottom of which extends a neck 14 which projects through an opening formed centrally of the cover 15 for the container 7 and fits snugly into the depending neck 16 of the cover. Therefore, when a large bottle 17 which serves as a reservoir for water is set in an inverted position upon a cushioning ring 18 about margins of the well 13 the neck of the bottle will extend downwardly through the neck 14 and into the neck 16. The neck 16 is of such depth that it projects downwardly below the bottle neck and, therefore, when the crock 7 is filled with water to the height shown in Figure 1, a water seal will be formed about the lower end of the neck 16 and warm air will be prevented from entering the crock through the neck 16 and also excluded from the chamber 3 as the water level is lowered and the crock refilled from the bottle.

Figures 2, 11:
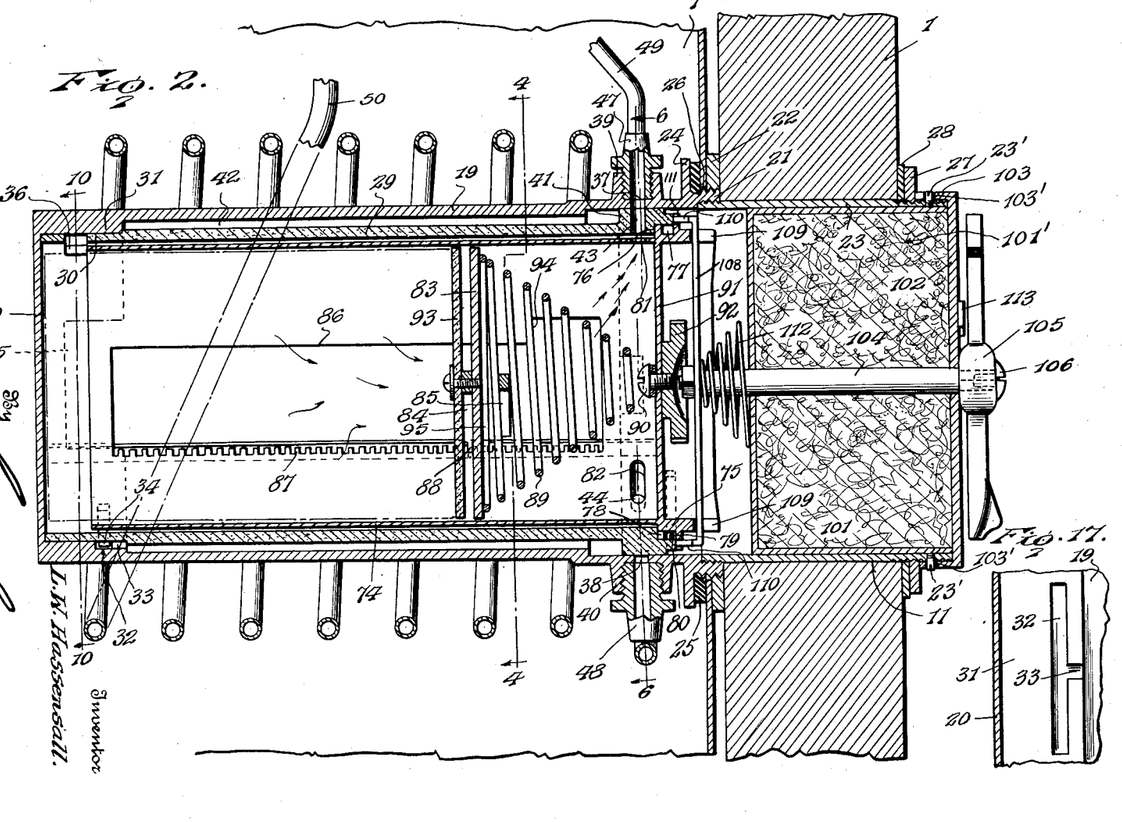
Figure 2 is a longitudinal sectional view through the container for the solid carbon dioxide serving as a cooling medium.
Figure 11 is a view similar to Figure 10 showing the manner in which gas is allowed to pass between the two shells when the inner shell is in the positions shown in Figures 8 and 9.

The container for the cooling medium is constructed as shown in Figure 2 and has an outer shell 19 formed of metal which will not corrode or rust. This shell 19 is closed at its inner end by a head 20 and its outer end portion 21 is externally threaded for engagement by a securing ring 22 and internally threaded for engagement by the threaded inner end of an extension or neck 23 formed of bakelite or any other heat insulating material found suitable. A collar 24 is formed about the outer shell near its outer end for engagement by a gasket 25 and, therefore, when the threaded outer end portion of the shell is passed through an opening 26 formed in the crock 7 and the securing ring 22 applied, a water-tight joint will be formed. The neck or extension 23 projects outwardly through the opening 11 in the cooler 1 and carries a securing ring 27 which bears against a rubber gasket 28 and forms a tight joint. The neck 23 projects outwardly beyond the securing ring or nut 27 in order that a cap or closure for the outer end of the container may be applied.

An inner shell 29 formed of heat insulating material, such as bakelite, fits into the outer shell and has its inner end portion reduced slightly in thickness to form a reduced inner end 30 which fits snugly within the internally thickened inner end portion 31 of the outer shell. A slot 32 which extends circumferentially of the outer shell is formed in the thickened inner end portion 31 thereof and provided with a mouth or entrance 33 intermediate its ends so that a pin 34 which projects from the reduced inner end portion 30 of the inner shell may be passed through the mouth and engaged in the slot to retain the inner shell in its proper position in the outer shell and limit rotation of the inner shell.

Figure 6:
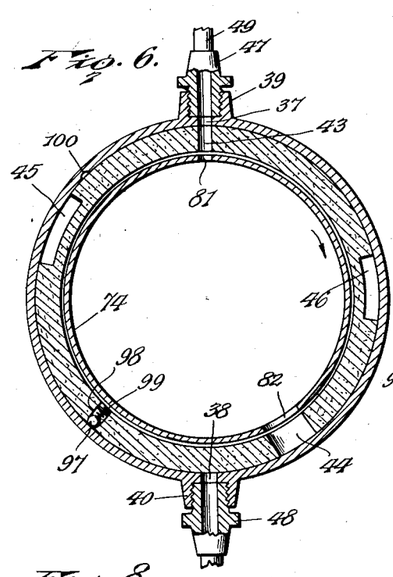
Figure 6 is a sectional view taken transversely through the container along the line 6—6 of Figure 2 with the inner shell of the container in a position to cause gas to flow through the pipe leading directly to an outlet and causing water in the water container to be cool.
Figure 7:
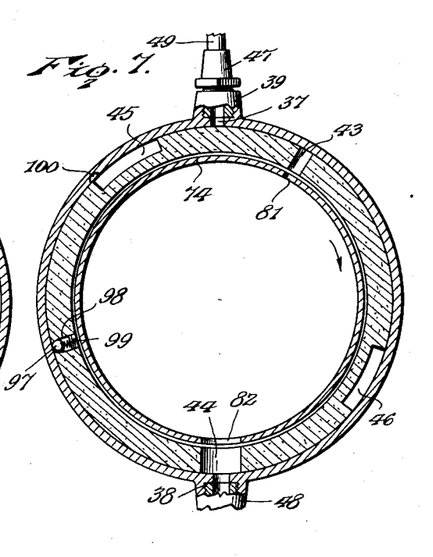
Figure 7 is a view similar to Figure 6 showing the inner shell moved to an adjusted position in which gas will flow through the tube formed into a coil about the container and cause the water to be cooler.
Figure 8:
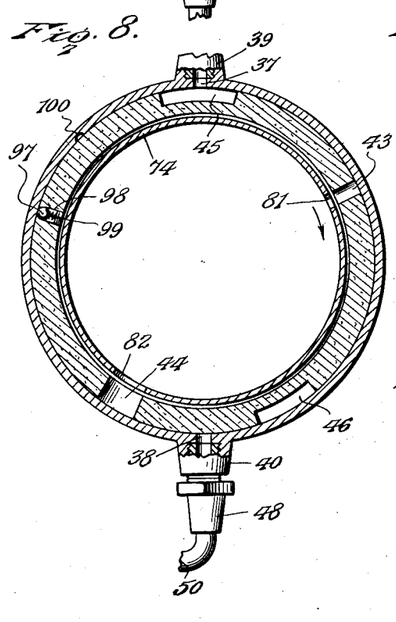
Figure 8 is a view showing the inner shell moved to such a position that the gas will flow between the inner and outer shells of the container before passing outwardly through the tube leading directly to an outlet and by chilling the outer shell cause water in the container to be cold.
Figure 9:
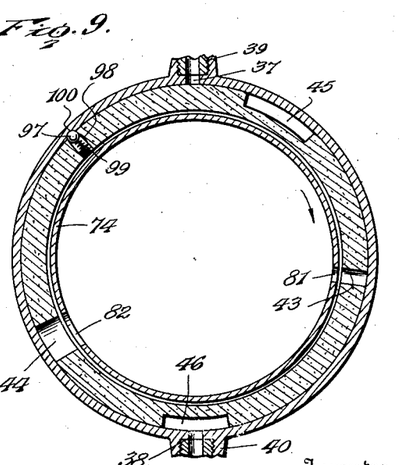
Figure 9 is a view similar to Figure 8 showing the inner shell moved to such a position that gas after passing between the inner and outer shells will enter the tube coiled about the container and cause the water to be colder.
Figure 10:
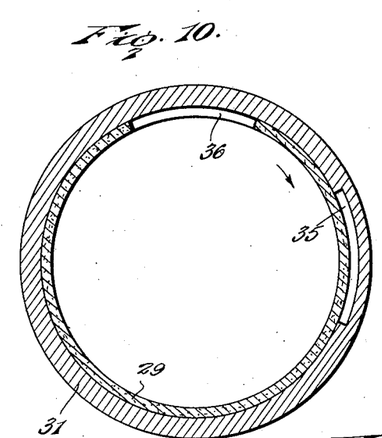
Figure 10 is a transverse sectional view taken along the line 10—10 of Figure 2 and showing the manner in which gas is prevented from passing between the inner and outer shells when the inner shell is in the positions shown in Figures 6 and 7.
Figure 11:
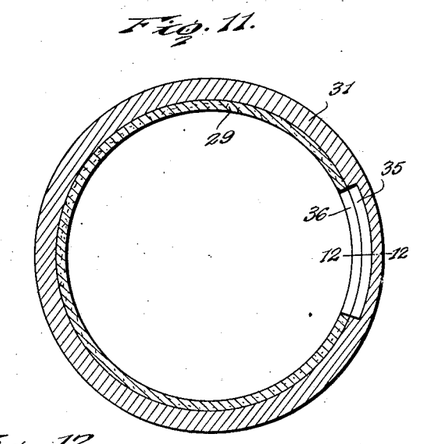
Figure 12:
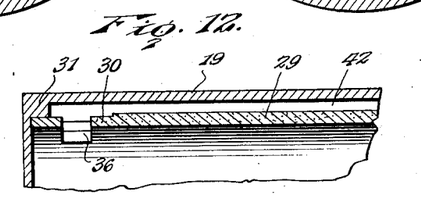
Figure 12 is a fragmentary sectional view taken along the line 12—12 of Figure 11.

A recess or pocket 35 is formed in the thickened portion 31 of the outer shell and the inner end portion of the inner shell is formed with a slot 36 which is disposed out of registry with the recess when the inner shell is in the positions shown in Figures 6 and 7, as shown in Figure 10, and moved into registry with the recess, as shown in Figure 11, when the inner shell is moved towards the positions shown in Figures 8 and 9. The outer end portion of the outer shell is offset or internally reduced in thickness and formed with opposed openings 37 and 38 which communicate with bosses or sockets 39 and 40, and while these sockets have been shown projecting from upper and lower portions of the outer shell it will be understood that they could project from side portions.

A collar 41 is formed about the outer end portion of the inner shell to fit snugly against walls of the outer shell and close the outer end of the space 42 between the inner and outer shells, and through the collar are formed openings 43 and 44 which are spaced from each other less than one-half the circumference of the inner shell. This collar is also formed with recesses 45 and 46 which are spaced from each other a distance corresponding to the distance between the openings 43 and 44 and so located with respect to the openings formed in the inner shell and outer shell that when the inner shell is turned from the position shown in Figure 6 towards that shown in Figure 9, the opening 44 will move into registry with the opening 38 when the opening 43 is moved out of registry with the opening 37, and the recess 45 then moved into registry with the opening 37 after which the recess 46 will move into registry with the opening 38. These successive positions are clearly shown in Figures 6 through 9.

In the sockets 39 and 40 are screwed nipples 47 and 48 carried by tubes 49 and 50, and, by referring to Figures 1 and 2, it will be seen that the tube 49 leads directly from the socket 39 to the distributer 9 whereas the tube 50 is formed into a coil 51 about the container 10 and then extended upwardly to the distributer. By this arrangement, water in the crock will be slightly cooled when the inner shell is in the position shown in Figures 2 and 6 by the cold gas passing through the openings 43 and 37 into the tube 49. When the inner shell is moved into the position shown in Figure 7, the opening 37 is closed and the opening 44 moved into registry with the opening 38 and the cold gas then passes through the coil 51 and up through the tube 50 to the distributer. Therefore, the water will be reduced to a lower temperature as the coil serves very effectively as a cooling coil. By turning the inner shell to the position shown in Figure 8, the recess 45 will be moved into registry with the opening 37 and by this time the slot 36 will have been moved from the position shown in Figure 10 towards that of Figure 11 to such an extent that it will partially overlap and register with the recess 35. Therefore, the gas will pass through the slot 36 and recess 35 into the space 42 between the inner and outer shells and through the recess or passage 45 into the tube 49. The water will not only be slightly cooled by the tube 49, but since the gas passes between the two shells the outer metal shell will be chilled and permitted to serve greatly as a cooling element for water in the lower portion of the crock. When the inner shell is moved to the position shown in Figure 9, the slot 36 will be moved into complete registry with the recess 35 as shown in Figure 11 and the recess or passage 46 will communicate with the opening 38. Therefore, the cold gas will pass through the coil 51 and since this coil is disposed about the outer shell which is chilled by the gas passing through it, the water in the lower portion of the crock will be further reduced in temperature.

Figures 13, 14, 15, 16:
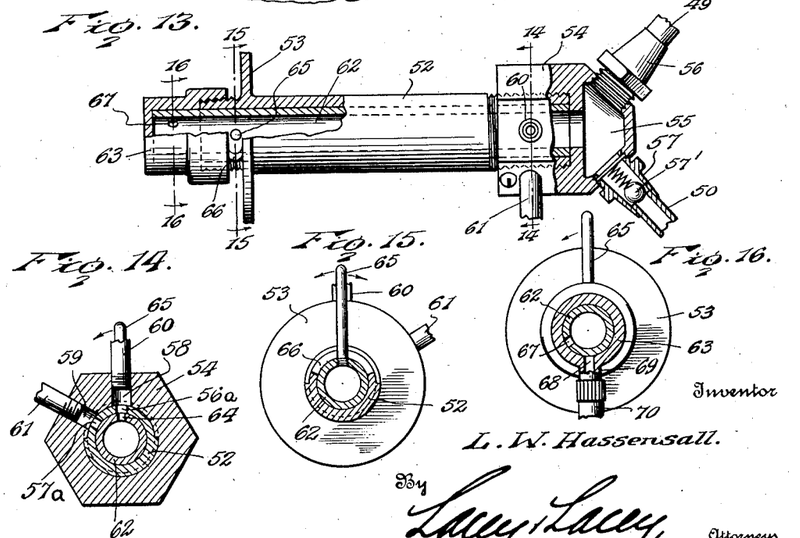
Figure 13 is an enlarged view of the distributer to which the tubes are attached, the distributer being shown partially in elevation and partially in section.
Figure 14 is a transverse sectional view taken through the inner portion of the distributer along the line 14—14 of Figure 13.
Figure 15 is a view taken transversely through the outer portion of the distributer along the line 15—15 of Figure 13 and illustrating the manner in which the distributer is adjusted.
Figure 16 is a transverse sectional view taken along the line 16—16 of Figure 13.

The distributor 9 consists of a tubular body or pipe 52 which extends through an opening formed in the wall of the cooler and is provided with a collar 53 to bear against the outer face of the wall and limit its inward movement when a securing nut 53' is applied and tightened, whereby the distributer will be firmly held in place. The tubular body projects into the crock 7 and has a coupling 54 screwed tightly upon its threaded inner end.

This coupling is formed with a chamber 55 having side openings in which are screwed nipples 56 and 57 at the upper ends of the tubes 49 and 50 and therefore gas passing through either tube will be delivered into the chamber 55. An outwardly opening check valve 57' in the nipple 57 controls flow of gas through this nipple and the tube 50. Openings 56$^a$ and 57$^a$ are formed in the pipe 52 to register with openings 58 and 59 formed in the coupling 54 and in these openings 58 and 59 are secured tubes 60 and 61.

The tube 60 extends upwardly through the cover 15 of the crock and therefore when the gas is delivered through the tube it may fill the interior of the chamber 3 about the crock and pass downwardly through the pipe 5 into the lower chamber or compartment 4 to cool said lower food compartment. Suitable vents may be provided to permit the gas to escape from the lower compartment to the atmosphere or any other means provided for permitting the gas to eventually escape.

The tube 61 extends downwardly to a position near the bottom of the crock and if gas is passing through this tube it will bubble up through the water in the crock and carbonize the water. The gas after passing through the water, passes out of the crock, its cover fitting snugly but not air tight, and will pass through the pipe 5 into the lower compartment. It will thus be seen that water in the crock may be carbonized or remain in its original condition. In order to control the passage of gas through the tubes 60 and 61, there has been provided a valve in the form of a sleeve 62 which fits snugly in the pipe 52 and is retained in place by a cap 63 screwed upon the threaded outer end portion of the pipe or tubular end 52.

This tube 62 is formed with an opening 64 near its inner end which may be moved into registry with either the opening 58 or the opening 59. Under normal conditions the opening 64 is disposed in registering relation with the opening 56$^a$ and therefore the gas will pass through the pipe or tube 60.

A stem or actuating rod 65 is provided for rotating the sleeve 62 and projects outwardly therefrom a slot 66 formed in the pipe 52 between the collar 53 and the cap 63. When the opening 64 is in registry with the opening 56$^a$ the operating stem will be disposed vertically midway the length of the slot 66. The stem may be moved towards one end of the slot to move the opening 64 into register with the opening 57$^a$, or it may be moved towards the other end of the slot in which position the opening 64 will not register with either of the openings 56$^a$ or 57$^a$. When the valve sleeve is in the last-mentioned position, an opening 67 formed near its outer end will register with a side opening 68 forming a continuation of the bore of a neck 69 on the cap 63 to which a tube 70 is connected and the gas will then pass through the tube 70 and may be delivered into a glass 71 filled with water and resting upon a glass supporting bracket 72 carried by the cooler below the faucet 8. It should be noted that the tube 70 is provided intermediate its length with a flexible section 73 formed of rubber tubing in order that the tube may be easily moved into or out of the glass and not interfere with placing a glass upon the bracket 72.

Within the inner shell of the container 10 is disposed a cylindrical jacket 74 which has its outer end portion thickened externally to form a collar 75 to bear against a circumferentially extending shoulder 76 formed in the inner shell. A groove 77 extends circumferentially about the collar 75 and from this groove leads a notch 78 so that a pin 79 projecting from the circumferentially extending flange 80 at the outer end of the inner shell may engage in the groove 77 and retain the jacket in its proper position with the inner shell and guide the turning of the jacket. Openings 81 and 82 are formed in the jacket to register with the openings 43 and 44 formed through the collar or annular shoulder 41 of the inner shell. Therefore gas may escape from within the jacket and the inner shell to reach the openings 37 and 38 when the inner jacket is in the positions shown in Figures 6, 7 and 10 and the slot 36 out of registry with the recess 35.

Figures 4, 5:
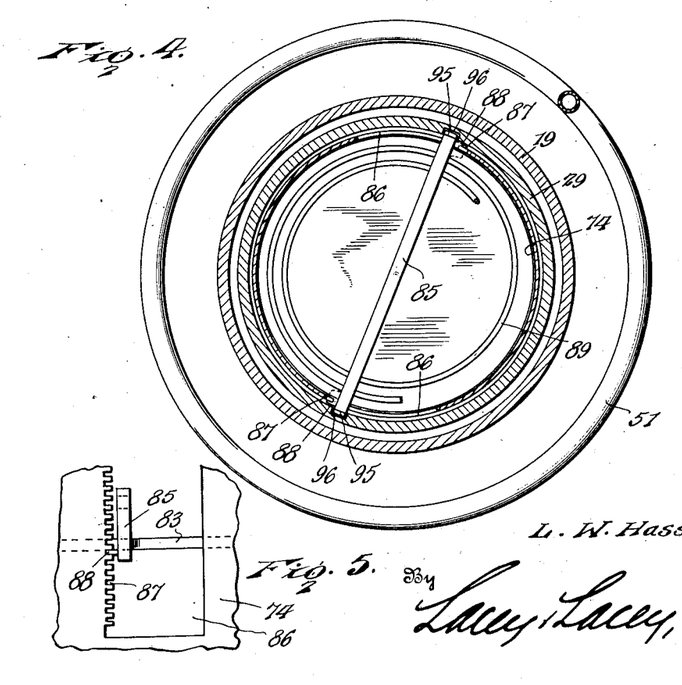
Figure 4 is a transverse sectional view through the container taken along the line 4—4 of Figure 2.
Figure 5 is a fragmentary view illustrating the manner in which a follower mounted in the container is releasably secured in a set position.

Within the jacket is disposed a follower 83 secured to the lower bar 84 of a yoke 85 which is of sufficient length to project from opposite sides of the follower and engage through slots or passages 86 formed longitudinally of the jacket in opposite sides thereof. Each of these openings has rack teeth 87 along one side edge and at opposite ends of the lower bar of the yoke are formed fingers 88 to engage the rack teeth and releasably hold the follower in a set position and prevent it from being moved longitudinally in the jacket by the coil spring 89 which extends longitudinally in the jacket and has one end firmly secured to the follower and its other end engaged by a screw 90 carried by the head 91 closing the outer end of the jacket. The screw 90 will be firmly held in place as it extends into a knob 92 by means of which the jacket is to be inserted into the inner shell or removed therefrom.

A shield 93, formed of bakelite or other heat insulating material, prevents the follower from contacting with a block of solid carbon dioxide fitted into the jacket and thereby waste of the carbon dioxide is prevented. The follower should be retained in a retracted position while the block of solid carbon dioxide is being set in place and the jacket fitted into the inner shell, and in order to do so each slot 86 has its outer end portion widened, thereby providing each slot with a side extension or shoulder 94 upon which ends of the lower bar 84 may rest and retain the follower in its retracted position. The end bars 95 of the yoke 85 fit into grooves 96 formed longitudinally in the walls of the inner shell to guide sliding movement of the follower, and the pin 79 is located at such a distance from one of said grooves that when the jacket is inserted into the inner shell and the end bars of the yoke engage in the grooves, it is necessary to turn the jacket a short distance in order to permit the pin to pass through the notch 78 and engage in the groove 77. During this initial turning motion the end bars will be moved off the shoulders 94 and across the slots 86 to such a position that the fingers 88 will be engaged with the fingers of the racks 87. The teeth remain in engagement with the racks during the first four positions of the inner shell shown in Figures 6, 7, 8 and 9, and the follower will be prevented from exerting pressure upon the block of solid carbon dioxide. By holding the inner shell stationary and then imparting a further rotation to the jacket the fingers 88 will be moved out of engagement with the teeth of the racks 87 and the spring 89 can then expand and cause the follower to apply pressure to the block of carbon dioxide and force this block to close contacting engagement with the head 20 of the outer shell. Therefore the outer shell will be chilled not only by action of the gas passing between the inner and outer shells, but also by direct contact of its inner head with the block of carbon dioxide and the greatest cooling action will take place. By returning the jacket to the position shown in Figure 9, the fingers will be again moved into engagement with teeth of the racks and further expansion of the spring will be prevented, and as soon as the block of carbon dioxide has evaporated sufficiently, it will again be out of contact with the head at the inner end of the outer shell. A latch ball 97, mounted in a pocket 98 in the inner shell and engaged by a spring 99 so that it is urged outwardly for engagement in a notch or seat 11 formed in the outer shell when the inner shell is moved to the position shown in Figure 9, serves to hold the inner shell stationary and permit the jacket to be rotated independently of the inner shell to move the fingers 88 out of engagement with the teeth of the racks 87.

In order to close the outer end of the container 10, there has been provided a plug 101 which is hollow and filled with suitable insulating material 101' and of the proper diameter to fit snugly within the neck or extension 23 of the outer shell. The head 102 at the outer end of this plug projects radially therefrom and is formed with a marginal flange 103 which fits about the outer end of the neck 23 and bears against the securing ring or nut 27. Bayonet slots 103' formed in the flange 103 receive pins 23' which project radially from the neck 23 in order to securely but releasably hold the cover and plug 101 in place.

Figure 3:
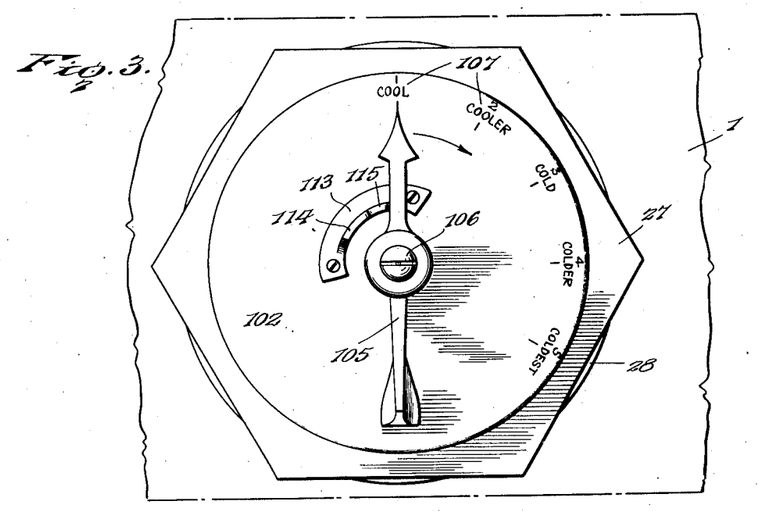
Figure 3 is a view looking at the outer end of the container for the cooling medium.

A shaft 104 extends axially through the plug or filler 101 where it is rotatably mounted and upon its outer end is mounted a handle 105 held in place by a screw 106. This handle is in the shape of an arrow and serves as a pointer to cooperate with the markings 107 stamped into the outer face of the cap 102 and indicate when the shaft has been rotated to its proper position in order to turn the inner shell and jacket to a desired adjusted position. At its inner end the shaft carries a cross bar 108 which engages through recesses or seats 109 formed in opposite portions of the flange 75 and at the ends of the cross bar are provided fingers 110 which project from the cross bar longitudinally of the container to engage in recesses or seats 111 formed in opposite portions of the marginal flange 80 of the inner shell.

A spring 112 disposed between the plug and the cross bar resists outward movement of the shaft 104 and retains the cross bar and its fingers in position to engage in the recesses 109 and 111. Against the outer face of the cap 102 is secured a bracket 113 having an outstanding flange 114, one end portion of which is extended outwardly to form a shoulder 115. This bracket constitutes an abutment for engagement by the pointed end of the handle to limit its turning movement towards the left in Figure 3 beyond the position shown in this figure.

By grasping the handle and turning it towards the right in Figure 3, the cross bar 108 by engagement with the jacket and inner shell will cause them to turn together until the inner shell and jacket reach the position shown in Figure 9 and when they are in this position, the pointer will extend towards the word colder. If additional movement towards the right is imparted to the handle, the latch 97 by engaging in the seat 100 will hold the inner shell stationary and as the handle moves on to the flange 114 in order to move towards the position designated coldest in Figure 3, the flange will act as a cam and the shaft 104 will be drawn outwardly against the action of the spring 112 and the fingers 110 will be moved out of the recesses 111, but the cross bar will still remain in the recesses 109. Therefore the jacket may be turned to release the follower from the racks 87 and the spring 89 permitted to impart movement to the follower which will force the block of solid carbon dioxide into close contacting engagement with the head 20 at the inner end of the outer shell.

By returning the pointer to the position shown in Figure 3, the fingers 88 will be again moved into engagement with the racks and the fingers 110 will move about the outer end of the inner shell until the spring 112 again forces them into the recesses 111. Therefore the inner shell and jacket can be moved together towards the left and passage of gas from the container through the tubes 49 and 50 controlled.

By moving the handle on to the shoulder 115, the shaft 104 will be drawn outwardly a sufficient distance to move the cross bar out of the recesses 109 and the closure can then be unscrewed and removed in order to withdraw the jacket and insert a new block of solid carbon dioxide. After the new block of solid carbon dioxide has been fitted into the jacket, the jacket is replaced and the closure then thrust into the neck 23 and its flanges secured upon the neck.

What is claimed is:

1. In a water cooler, a casing having a water chamber therein and formed with a side opening, a container for a cooling medium disposed transversely in said water chamber and having an outer shell having its outer portion engaged through the side opening of the casing, a head closing the inner end of the outer shell, said shell having circumferentially spaced side openings, tubes leading from the side openings for conducting cooling gas through water in the water chamber and one being formed into a coil, an inner shell rotatably received in the outer shell and provided with circumferentially spaced ports and circumferentially spaced external passages selectively moved into registry with the side openings of the outer shell by rotating the inner shell, a removable closure for the outer end of the outer shell, and means carried by said closure to turn the inner shell to adjusted positions.

2. In a water cooler, a casing having a water chamber therein and formed with a side opening, a container for a cooling medium disposed transversely in said water chamber and having an outer shell having its outer portion engaged through the side opening of the casing, a head closing the inner end of the outer shell, said shell having circumferentially spaced side openings, tubes leading from the side openings for conducting cooling gas through water in the water chamber and one being formed into a coil, an inner shell rotatably received in the outer shell and provided with circumferentially spaced passages moved into and out of registry with the side openings of the outer shell by rotating the inner shell, a removable closure for the outer end of the outer shell, and means carried by said closure to turn the inner shell to adjusted positions.

3. In a water cooler, a casing having a water chamber therein and formed with a side opening, a container for a cooling medium disposed transversely in said water chamber and having an outer shell having its outer portion engaged through the side opening of the casing, a head closing the inner end of the outer shell, said shell having circumferentially spaced side openings, tubes leading from the side openings for conducting cooling gas through the water in the water chamber and one being formed into a coil, an inner shell rotatably received in the outer shell and provided with circumferentially spaced external passages selectively moved into registry with the side openings of the outer shell by rotating the inner shell, the inner end portions of the shells being formed with passages to register when the external passages of the inner shell are in registry with the side openings of the outer shell, a removable closure for the outer end of the outer shell, and means carried by said closure to turn the inner shell to adjusted position.

4. In a water cooler, a casing having a water chamber therein and formed with a side opening, a container for a cooling medium disposed transversely in said water chamber and having an outer shell having its outer portion engaged through the side opening of the casing, a head closing the inner end of the outer shell, said shell having circumferentially spaced side openings, tubes leading from the side openings for conducting cooling gas through the water in the water chamber and one being formed into a coil, an inner shell rotatably received in the outer shell and provided with circumferentially spaced external passages selectively moved into registry with the side openings of the outer shell by rotating the inner shell, the inner end portions of the shells being formed with passages to register when the external passages of the inner shell are in registry with the side openings of the outer shell, a jacket rotatably received in the inner shell and having a head for its outer end, a follower in said jacket, a spring between the follower and head of the jacket to urge the follower towards the inner ends of the jacket and shells, the jacket being provided with a rack and the follower with means for engaging the rack to retain the follower in a set position in the jacket, a removable closure for the outer end of the outer shell, and means carried by said closure to simultaneously rotate the inner shell and jacket and being adjustable whereby the jacket may be rotated independently and moved to release the follower for expansion of the spring to move the follower inwardly and force the cooling medium into contact with the head at the inner end of the outer shell.

5. In a water cooler, a casing having a water chamber therein and formed with a side opening, a container for a cooling medium disposed transversely in said water chamber and having an outer shell having its outer portion engaged through the side opening of the casing, a head closing the inner end of the outer shell, said shell having circumferentially spaced side openings, tubes leading from the side openings for conducting cooling gas through the water in the water chamber and one being formed into a coil, an inner shell rotatably received in the outer shell and provided with circumferentially spaced external passages selectively moved into registry with the side openings of the outer shell by rotating the inner shell, the inner end portions of the shells being formed with passages to register when the external passages of the inner shell are in registry with the side openings of the outer shell, a jacket rotatably received in the inner shell and having a head for its outer end, a follower in said jacket, a spring between the follower and head of the jacket to urge the follower towards the inner ends of the jacket and shells, the jacket being provided with a rack and the follower with means for engaging the rack to retain the follower in a set position in the jacket, a removable closure for the outer end of the outer shell, a rod extending axially through the closure and being slidably and rotatably mounted, a handle at the outer end of said rod, and an element at the inner end of said rod for engaging the jacket and inner shell to simultaneously rotate the same, said element moving out of engagement with the inner shell when the rod is drawn outwardly whereby the jacket may be rotated independently and moved to release the follower for expansion of the spring to move the follower inwardly and force the cooling medium into contact with the head at the inner end of the outer shell.

6. In a cooler, a casing having a water chamber therein and formed with a side opening, a container for a cooling medium disposed transversely in said water chamber and having an outer shell having its outer portion engaged through the side opening of the casing, a head closing the inner end of the outer shell, said shell having circumferentially spaced side openings, tubes leading from the side openings for conducting cooling gas through the water in the water chamber and one being formed into a coil, an inner shell rotatably received in the outer shell and provided with circumferentially spaced external passages selectively moved into registry with the side openings of the outer shell by rotating the inner shell, the inner end portions of the shells being formed with passages to register when the external passages of the inner shell are in registry with the side openings of the outer shell, a jacket rotatably received in the inner shell and having a head for its outer end, a follower in said jacket, a spring between the follower and head of the jacket to urge the follower towards the inner ends of the jacket and shells, the jacket being provided with a rack and the follower with means for engaging the rack to retain the follower in a set position in the jacket, a removable closure for the outer end of the outer shell, a rod extending axially through the closure and being slidably and rotatably mounted, a handle at the outer end of said rod, a cross bar carried by the inner end of said rod and having fingers at its ends to engage in notches formed in the jacket and inner shell and simultaneously rotate the jacket and inner shell when the rod is turned, and a spring about the rod between the cross bar and closure yieldably resisting outward movement of the rod, said cross bar being moved to release its fingers from the notches of the inner shell when the rod is drawn outwardly whereby upon rotation of the rod the jacket may be rotated independently and moved to release the follower for expansion of the spring to move the follower inwardly and force the cooling medium into contact with the head at the inner end of the outer shell.

7. In a water cooler, a casing having a water chamber therein and formed with a side opening, a container for a cooling medium disposed transversely in said container and having a neck engaged through the side opening, said container having an outer shell provided with a head at its inner end, an inner shell open at its ends and rotatably received in the outer shell, a cylindrical jacket rotatably received in the inner shell and having an outer head, the inner shell being spaced from the outer shell for the major portion of its length and having its inner and outer end portions in close contacting engagement therewith, means being provided to limit rotation of the jacket and inner shell, the outer shell being provided near its outer end with side openings having discharge tubes leading therefrom, the inner shell having its outer portion formed with passages spaced from each other to successively register with the side openings of the outer shell when the inner shell is rotated, said jacket having side openings movable into and out of registry with certain of said passages by rotating the jacket, a closure for the outer end of the neck, and means carried by the closure for rotating the jacket and inner shell.

8. In a water cooler, a casing having a water chamber therein and formed with a side opening, a container for a cooling medium in said chamber extending inwardly from the side opening, said container having an outer shell provided with a head at its inner end, an inner shell removably received in the outer shell and having limited rotation therein, the inner end of the outer shell being internally thickened to form an inner annular shoulder and the outer end of the inner shell externally thickened to form an outer annular shoulder, the portion of the inner shell between the shoulders being spaced from the outer shell, the outer shell being formed with openings adapted to be closed at their inner ends by the outer shoulder of the inner shell, tubes leading from said side openings and one being coiled about the outer shell, said tubes extending upwardly in the water chamber to an outlet, the inner shell having outlet ports formed through its outer shoulder to successively register with the side openings of the outer shell when the inner shell is rotated, recesses being formed in the outer shell to register with the side openings of the inner shell in succeeding relation to the outlet ports when the inner shell is rotated and establish communication between the side openings and the space between the shells, the inner shoulder being formed with a pocket opening into the space between the shells and the inner shell being formed with a circumferentially extending slot to register with the pocket and establish communication between the interior of the inner shell and the space between the shells when the recess of the outer shoulder are in registry with the side openings of the outer shell, a cylindrical jacket rotatably received in the inner shell and having a head at its outer end and formed with side ports to register with the side ports of the inner shell, a removable closure for the outer end of said container, and means carried by said closure to rotate the jacket and inner shell.

9. In a water cooler, a casing having a water chamber therein and formed with a side opening, a container for a cooling medium in said chamber extending inwardly from the side opening, said container having an outer shell provided with a head at its inner end, an inner shell removably received in the outer shell and having limited rotation therein, the inner end of the outer shell being internally thickened to form an inner annular shoulder and the outer end of the inner shell externally thickened to form an outer annular shoulder, the outer shell being formed with openings adapted to be closed at their inner ends by the outer shoulder of the inner shell, tubes leading from said side openings and one being coiled about the outer shell, said tubes extending upwardly in the water chamber to an outlet, the inner shell having outlet ports formed through its outer shoulder to successively register with the side openings of the outer shell when the inner shell is rotated, recesses being formed in the outer shell in succeeding relation to the outlet ports when the inner shell is rotated and establish communication between the side openings and space between the shells, the inner shoulder being formed with a pocket opening into the space between the shells and the inner shell being formed with a circumferentially extending slot to register with the pocket and establish communication between the interior of the inner shell and the space between the shells when the recesses of the outer shoulder are in registry with the side openings of the outer shell, a cylindrical jacket rotatably received in the inner shell and having a head at its outer end and formed with side ports to register with the side ports of the inner shell, a neck extending from said outer shell through the opening in said casing, a plug to close said neck fitted into the same from its outer end, a shaft extending axially through said plug and having a handle at its outer end constituting a pointer, a yoke at the inner end of said shaft, a spring yieldably resisting outward movement of said shaft, said yoke engaging in seats in the inner shell and having fingers engaging in seats in the outer shell whereby the shells will rotate toether, and means to move the shaft outwardly and release the yoke from the shells whereby said plug may be removed.

10. In a water cooler, a casing having a water chamber therein, a crock in said water chamber having a side opening aligned with a side opening in said casing, a container for a cooling medium extending transversely in said crock and having a shell secured in the opening of the crock and extending through the opening in the casing, a tube leading from said shell, and a distributer connected with said tube for directing cooling gas passing through the tube either out of said casing or into the water chamber.

11. In a water cooler, a casing having a water chamber therein, a crock in said water chamber having a side opening aligned with a side opening in said casing, a container for a cooling medium extending transversely in said crock and having a shell secured in the opening of the crock and extending through the opening in the casing, a tube leading from said shell, and a distributer connected with said tube for directing cooling gas passing through the tube either out of said casing or into the water chamber, said casing being provided with a chamber below the water chamber, and a tube leading from the water chamber into the lower chamber for delivering cooling gas thereto.

12. In a water cooler, a casing having a water chamber therein, a crock in said water chamber having a side opening aligned with a side opening in said casing, a container for a cooling medium extending transversely in said crock and having a shell secured in the opening of the crock and extending through the opening in the casing, a tube leading from said shell for conducting cooling gas through water in said crock, a head for the upper end of said crock formed with an opening surrounded by a sleeve extending downwardly into the crock below the normal water level, and a cover for said casing formed with a cup to receive the neck of an inverted bottle, said cup terminating in a neck engaged in said sleeve.

13. In a water cooler, a casing having a water chamber therein, a crock in said water chamber having a side opening aligned with a side opening in said casing, a container for a cooling medium extending transversely in said crock and having a shell secured in the opening of the crock and extending through the opening in the casing, a tube leading from said shell for conducting cooling gas through water in said crock, and a distributer consisting of a pipe extending through a side of said casing, a coupling connecting the inner end of said pipe with said gas tube, ports being formed through the coupling and inner end portion of said pipe, a tube leading from one port for delivering cooling gas into the water chamber outside the crock, a tube leading from the other port for delivering gas into the crock below the water level, and a sleeve rotatably mounted in said pipe and formed with a side port moved into registry with a selected side port of the pipe by turning the sleeve.

14. In a water cooler, a casing having a water chamber therein, a crock in said water chamber having a side opening aligned with a side opening in said casing, a container for a cooling medium extending transversely in said crock and having a shell secured in the opening of the crock and extending through the opening in the casing, a tube leading from said shell for conducting cooling gas through water in said crock, and a distributor consisting of a pipe extending through a side of said casing, a coupling connecting the inner end of said pipe with said gas tube, ports being formed through the coupling and inner end portion of said pipe, a tube leading from one port for delivering cooling gas into the water chamber outside the crock, a tube leading from the other side port for delivering gas into the crock below the water level, and a sleeve rotatably mounted in said pipe and formed with a side port moved into registry with a selected side port of the pipe by turning the sleeve, a cap for the outer end of said pipe formed with a side port, a tube leading from the side port of said cap whereby gas may be discharged into a water container externally of the casing, said sleeve having a side port moved into and out of registry with the port in the cap by rotating the sleeve, a circumferentially extending slot being formed in the outer portion of said pipe, and an actuating stem for said sleeve projecting radially therefrom through said slot and having its movement guided and limited by the slot.

In testimony whereof I affix my signature.

LOUIS W. HASSENSALL. [L. S.]